US 6,634,763 B1

(12) United States Patent
Leifer et al.

(10) Patent No.: US 6,634,763 B1
(45) Date of Patent: Oct. 21, 2003

(54) LIGHT APPARATUS FOR ILLUMINATING A COMPACT COMPUTER VIDEO SCREEN

(76) Inventors: Robert Leifer, 22 Durham Dr., Dix Hills, NY (US) 11746; Gabe Neiser, 2106 Nicole Dr., Port Jefferson Station, NY (US) 11776

( * ) Notice: Subject to any disclaimer, the term of this patent is extended or adjusted under 35 U.S.C. 154(b) by 218 days.

(21) Appl. No.: 09/784,749

(22) Filed: Feb. 16, 2001

Related U.S. Application Data

(63) Continuation-in-part of application No. 09/615,564, filed on Jul. 13, 2000, which is a continuation-in-part of application No. 09/567,245, filed on May 9, 2000.

(51) Int. Cl.[7] ............................................. F21V 33/00
(52) U.S. Cl. ......................... 362/109; 362/85; 362/28; 362/99; 362/253
(58) Field of Search ........................... 362/28, 85, 109, 362/99, 253; 359/385

(56) References Cited

U.S. PATENT DOCUMENTS

| | | | |
|---|---|---|---|
| 5,091,832 A | 2/1992 | Tortola et al. | |
| 5,117,339 A | 5/1992 | Tortola et al. | |
| 5,119,239 A | 6/1992 | Iaquinto et al. | |
| 5,130,907 A | 7/1992 | Tortola et al. | |
| 5,165,779 A | * 11/1992 | Tortola et al. | 362/109 |
| 5,325,280 A | 6/1994 | Tortola et al. | |
| 6,354,713 B1 | * 3/2002 | Leifer et al. | 362/109 |
| 6,361,370 B1 | * 3/2002 | Neiser | 439/638 |
| 6,367,946 B1 | * 4/2002 | Leifer et al. | 362/190 |
| 6,517,068 B1 | * 2/2003 | Leifer et al. | 273/148 R |
| 6,517,069 B1 | * 2/2003 | Leifer et al. | 273/148 R |
| 6,533,431 B2 | * 3/2003 | Leifer et al. | 362/109 |

* cited by examiner

Primary Examiner—Thomas M. Sember
Assistant Examiner—Anabel Ton
(74) Attorney, Agent, or Firm—Keusey, Tutunjian & Bitetto, P.C.

(57) ABSTRACT

A combined magnifier/lighting apparatus for hand held video games utilizes a directional light source and an angularly adjustable reflective surface disposed opposite the directional source in a frame spaced from the display screen of the hand held device. The use of a directional light source and the adjustable reflective material provides an increased and more diffused lighting effect while eliminating the otherwise experienced hot spots or dark spots common in prior art light assemblies.

20 Claims, 13 Drawing Sheets

LIGHT APPARATUS FOR ILLUMINATING A COMPACT COMPUTER VIDEO SCREEN

RELATED APPLICATION INFORMATION

This application is a Continuation-in-Part of U.S. patent application Ser. No. 09/615,564 filed on Jul. 13, 2000, which is a Continuation-In-Part of U.S. patent application Ser. No. 09/567,245 filed on May 9, 2000.

BACKGROUND OF THE INVENTION

1. Field of the Invention

The present invention relates to hand held video games, and more particularly, to a combined light/magnifier assembly for the hand held video games devices for enhancing the viewing experience during game playing.

2. Description of the Related Art

Compact computers and video game devices having video viewing screens are becoming more and more popular and typically comprise hand-held portable, battery-operated devices. The viewing screen is typically a liquid crystal display (LCD) that is generally flat and displays information and or provides the screen for playing video games. Such compact computers and video games may include, but are not limited to: calculators, computer video games, lap top computers, and other computers where a variety of software is employed. In particular, compact video games, such as the compact video game systems known as GAME BOY™, GAME BOY POCKET™ and GAME BOY COLOR™ (Trademarks of Nintendo of America), are completely self-sustained video game systems which may be operated by interchangeably employing a collection from a library of software game packs. These Nintendo video game systems provide a compact, self-contained, battery-operated, portable hand-held computer with a cross key joy stick (directional-pad or D-pad) to operate the game start and select buttons, action buttons and an LCD-type screen, together with volume controls so as to display and enable the user to display images and play games.

While video display screens are employed and typically include a flat LCD-type screen, such LCD-type display screens are often difficult to observe by the user in partial or low light conditions, such as, for example, automobiles, planes, trains, buses, and the like due to the lack of illumination on the LCD screen to permit suitable contrast during use.

U.S. Pat. Nos. 5,091,832 and 5,325,280 show a light apparatus for use with compact computer screens. As shown and described, the body includes an open video space designed to be the same size as the LCD video screen of the compact computer apparatus. The body includes a pair of sloped or angled white colored side panels and a top and bottom side panel and the white or light colored panels extending directly generally perpendicular to the video screen rather than sloped as illustrated for the side panels. The top side panel is integral with and extends from the bottom molded section of the body when the body sections are matingly engaged to form the body, the top panel with the panels on the top section then form a rectangular, open video viewing space of the apparatus.

The light apparatus includes a pair of light bulbs placed on either side of sloping panels and which side panels also include a short, solid, upward extending light shield so as to prevent the direct glare of the light bulbs onto the LCD screen and to provide for indirect lighting through reflection on the light-colored side panels onto the LCD viewing screen.

U.S. Pat. Nos. 5,117,339 and 5,165,779 disclose combined light and magnifier devices for hand-held computers with video screens. Each of these patents show a battery operated light assembly that is mounted to a separate assembly mounted adjacent the view screen and spaced from the magnifier lens. The devices shown in these patents are adapted to provide a screen magnifier while also providing additional light to the screen for playing in low light conditions.

Unfortunately, the use of an LCD screen in these hand-held video game devices makes the illumination of the same difficult. The primary reason for this difficulty is due to the fact that the plastic cover to the actual LCD screen is generally of a high-gloss finish, and as such has a tendency to reflect light. This reflection of light primarily occurs when the light shines substantially directly onto the screen, and thus, the high-gloss screen cover prevents the light from penetrating the cover and thereby illuminating the LCD screen.

In all of the aforementioned patents, the lighting assembly utilizes light sources which are oppositely positioned within the solid frame surrounding the viewing screen, The use of white or light colored frame sides is implemented in an effort to diffuse the light before projected onto the screen, however, neither the white or light colored sides of the frame prevent spotting or "hot spots" caused by the illumination of the incandescent bulb immediately adjacent the viewing screen. As such, the incandescent bulb, in the area of disposition, causes a glare spot or "hot spot" on the high-gloss cover to the actual LCD display screen. Thus, the user's view is obstructed and not increased in these hot spot areas. Furthermore, dark spots are created on the screen where the additional light is not effectively distributed across the screen. In view of these drawbacks of the prior art patents, it would be desirable to provide a lighting assembly for a hand-held computer gaming device that does not have any screen "hot spots" or dark spots, and actually works to increase the viewing of the display screen.

SUMMARY OF THE INVENTION

It is therefore an object of the invention to provide an improved lighting assembly for hand-held video games that does not cause "hot spot" or other glaring effects from the use of light source to illuminate the LCD display.

It is yet another object of the invention to provide an improved lighting assembly for hand-held video games that effectively utilizes reflection techniques to efficiently illuminate the LCD display screen of the game device.

In accordance with another embodiment of the invention, the magnifying light assembly includes a frame opening substantially corresponding in size to the size of the compact computer video screen; a light source disposed in a side of the frame opening for projecting light toward an opposing side of said frame opening; and an adjustable reflective surface disposed at the opposing side of the frame opening and adapted to reflect the received light in a substantially evenly diffused configuration toward the video screen. Other preferred contemplated embodiments include a curved reflective surface, such as, for example, concave, convex, compound convex or a reflective surface having a simple radius of curvature.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numerals denote similar elements throughout the several views.

DETAILED DESCRIPTION OF PREFERRED EMBODIMENTS

Figure 1:
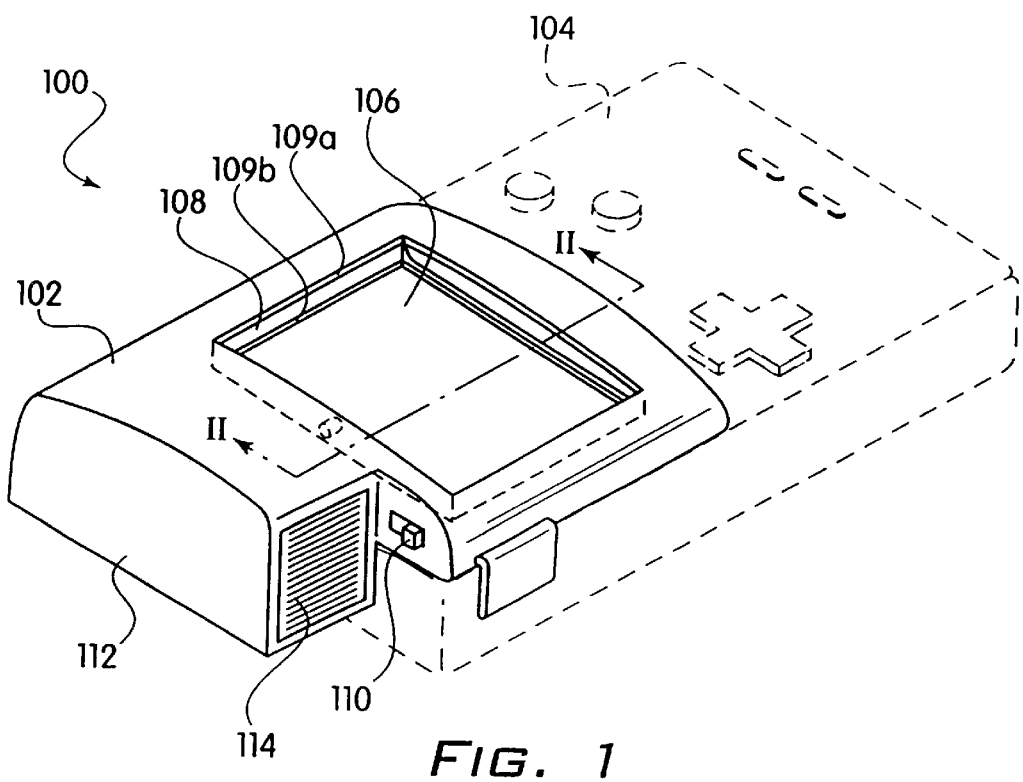
FIG. 1 is a perspective view of the improved lighting assembly according to an embodiment of the invention.

Referring to FIG. 1, there is shown the improved light assembly system 100 according to a first embodiment of the invention. Light assembly 102 is slidably disposed on the hand-held video game device 104 as shown and described in U.S. Pat. Nos. 5,091,832 and 5,325,280, both of which are incorporated herein by reference. Light assembly 102 includes an upper and lower frame opening 109a and 109b, respectively, that form an overall flame 108 that is substantially dimensioned according to the dimensions of the underlying display screen 106 on game device 104.

Figure 2:
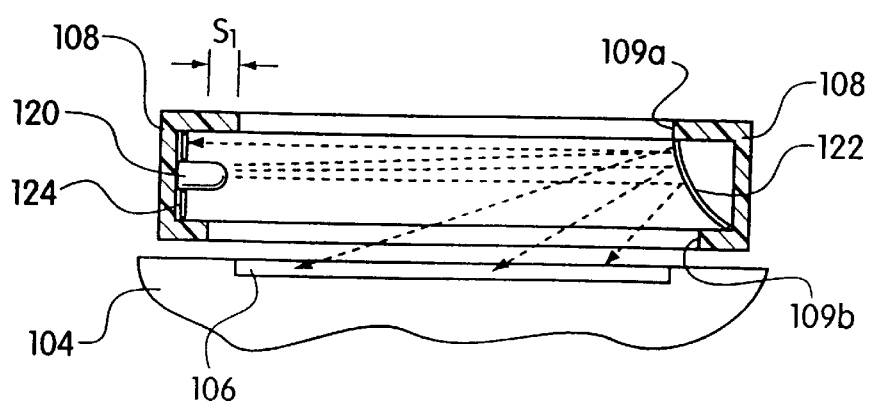
FIG. 2 is a cross-sectional view of the improved lighting assembly taken along lines II-II of FIG. 1.

Light assembly 102 includes a power on/off switch 110, a battery compartment 112 and an access panel 114 for allowing the replacement of the enclosed batteries (not shown). In subsequent embodiments, the use of an on/off switch and battery compartment are eliminated. FIG. 2 shows a cross-section of the flame 108 taken along lines II—II in FIG. 1. As shown, frame 108 includes has a substantially C-shaped cross-section and includes a light source 120 recessed into the frame and positioned so as to not protrude into the viewing area formed by upper and lower openings 109a and 109b. According to a preferred embodiment, upper frame opening 109a is smaller than the lower frame opening 109b by an offset distance $S_1$. This offset between the upper flame opening 109a and lower flame opening 109b prevents light from escaping upward beyond the upper frame opening 109a, regardless of the light source implemented. The different size frame openings are especially effective when incandescent light sources are used as light source 120. By increasing the opening size of the lower flame opening 109b, the light reflected by curved reflective surface 122 that is already is angled toward the lower frame opening now has an opening of increased size through which the light is received onto the video screen 106. The video screen 106 may be a liquid crystal display, a plasma display, a mini CRT, or any other type of video screen. Those of skill in the art will recognize that any other type of video screen may be used in the game device 104 without departing from the spirit of the invention.

The light source 120 is preferably a directional light source such as a directional light emitting diode (LED) and/or an incandescent light bulb having a collimating lens for directing the output light toward the opposing side of the flame 108 with as little dispersion prior to contacting the opposing side of the frame 108.

Opposite light source 120 is a curved reflective surface 122 adapted to reflect the received light back toward light source 120 and reflective surface 124 and down toward screen 106. The angle of curvature is preferably within a range of 45 –90 degrees with respect to the received collimated light beam. For example, curved reflective surface 122 is a partial or approximately ⅛ tubular section as shown. The top portion near upper flame opening 109a is angled at approximately 90 degrees with respect to the light beam, effectively reflecting light back toward light source 120 and reflective surface 124. The bottom portion of surface 122 near lower frame opening 109b is angled at approximately 45° with respect to the light beam, thereby reflecting light directly downward toward screen 106. Between the top and bottom portions, curved reflective surface 122 curves continuously between the 90° and the 45° angled portions. This variably curving central section of surface 122 reflects light onto screen 106 at a correspondingly broad range of angles thereby eliminating glare from almost any viewing angle. In this manner, the received collimated light beam is variably and angularly directed toward the display screen 106 of the game device.

Figure 3A:
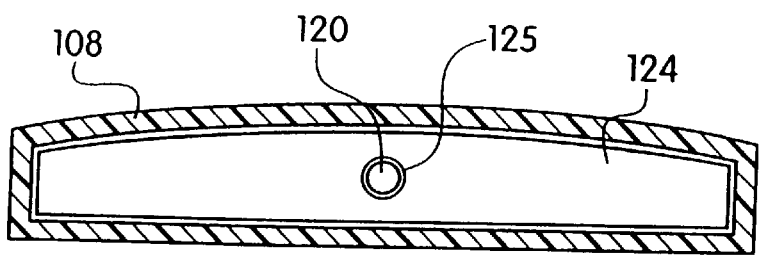
FIG. 3a is a sectional view of the improved lighting assembly according to a first embodiment of the invention.

In addition, a reflective surface 124 is disposed entirely around directional light source 120 and extends across the entire respective internal side of frame 108. FIG. 3a shows the disposition of reflective material 124 along the entire inside surface of frame 108 within which light source 120 is disposed. A hole 125 in reflective material 124 is provided to accommodate light source 120.

The reflective material implemented for materials 122 and 124 is preferably a mylar reflective material, but may also be any suitable known reflective material, and must be at least capable of being curved as depicted with reflective material 122.

As diagrammatically shown in FIG. 2, when directional light source 120 is illuminated, it projects a substantially collimated beam of light toward reflective surface 122. The collimation of light source 120 is provided by the previously mentioned directional LED, or may be provided through the use of an appropriate lens. An attribute of the light source 120 is that the light emanating therefrom does not disperse or come into contact with display screen 106 prior to being received by the opposing reflective surface 122.

Figure 3B:
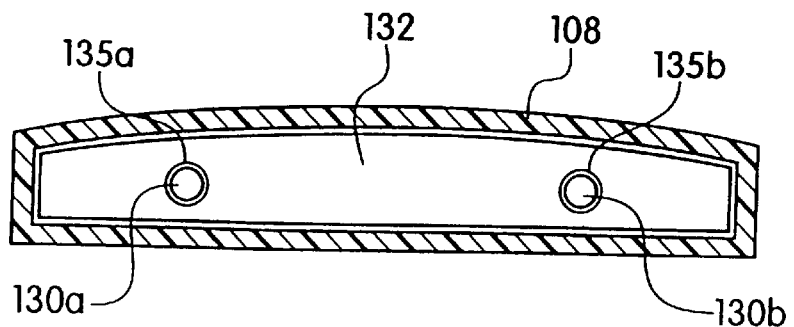
FIG. 3b is a sectional view of the improved lighting assembly according to a second embodiment of the invention.

Due to the curvature of reflective surface 122, some of the received light from light source 120 is reflected downward toward display screen 106 at various different angles, while other portions of the received light are reflected back toward the surface on which light source 120 is disposed. Thus, the additional reflective material 124 positioned around light source 120, shown in FIG. 3a, serves to further reflect light back toward the curved reflective surface 122. In this manner, the directional light originating from light source 120 is reflected at least once and potentially several times before the light is ultimately directed toward the display screen 106. Thus, when the light reaches the display screen 106, it is substantially diffused and thereby effectively illuminates display screen 106 more evenly and without any possibility of hot spots or glare spots as experienced with the lights of the prior art. FIG. 3b shows an alternative embodiment of the present invention wherein two light sources 130a and 130b are used, and two corresponding holes 135a and 135b are disposed in the reflective material 132 surrounding these light sources.

Figure 4:
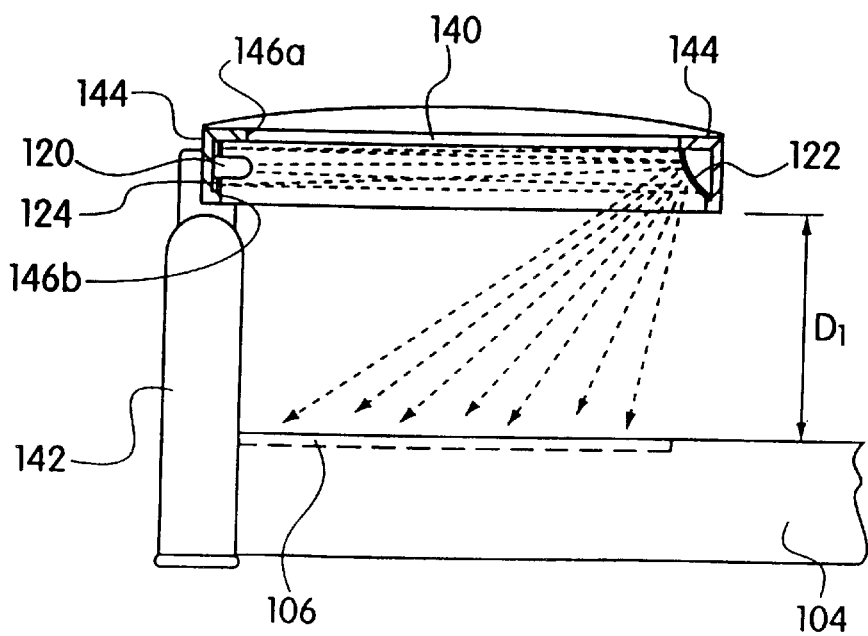
FIG. 4 is a side view of the improved lighting assembly as implemented into a combined light and magnifier for the hand held video game device according to a third embodiment of the invention.

FIG. 4 shows another embodiment of the lighting system of the present invention as incorporated into a display screen magnifier. Magnifiers of this type are disclosed in U.S. Pat. Nos. 5,117,339, 5,119,239 and 5,165,779, all of which are incorporated herein by reference. The magnifier 142 connects to the game device 104 such that a frame 144 is disposed a predetermined distance $D_1$, from the upper surface of the game device 104. Generally, a magnifying lens 140 is disposed within frame 144 so as to provide a magnified view of display screen 106 for the user. Frame 144 is made up of an upper flame opening 146a and lower flame opening 146b. As described with respect to the embodiment shown in FIG. 2, upper frame opening 146a is slightly smaller than lower frame opening 146b and thereby acts to block light from dispersing upward and out of the flame opening, while the larger lower flame opening 146b provides more area for the light to disperse and be reflected downward. As shown, the lighting system of the present invention is integrated into frame 144. Thus, when directional light source 120 is illuminated, the light beams are directed toward reflective surface 122, and are ultimately reflected downward by said reflective surface. As discussed previously, an additional surface of reflective material 124 is positioned around light source 120 and provides an additional surface from which light may reflect.

The use of the directional light source 120 in combination with the curved reflective surface 122 and oppositely positioned reflective surface 124 causes the light emanating from light source 120 to be reflected and re-reflected before ultimately being directed toward display screen 106. It is this reflection and re-reflection that results in a more diffused light being imposed on display screen 106. The diffused light is more evenly dispersed across the screen and does not cause hot spots, glare spots or dark spots on the high-gloss cover of the display screen 106.

Figure 5:
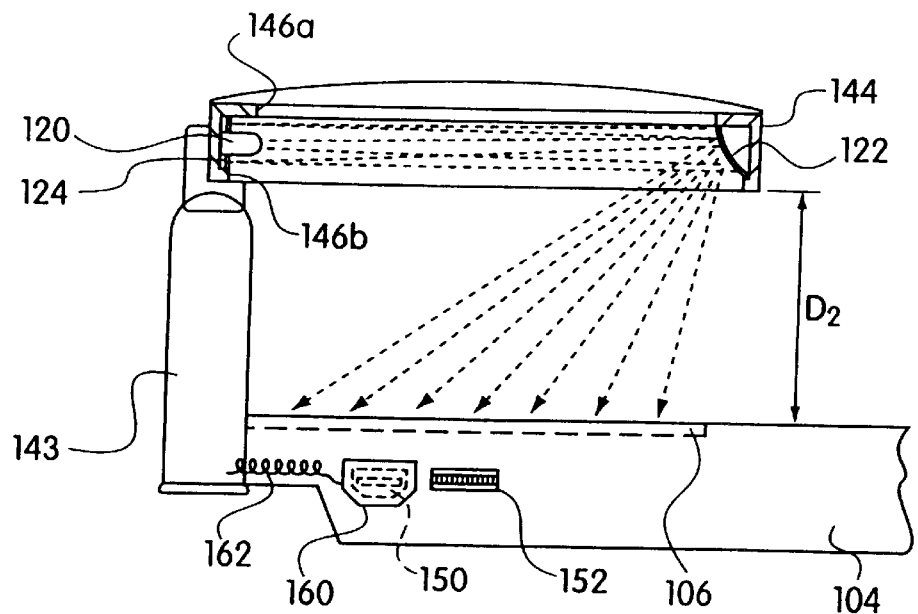
FIG. 5 is a side partial cross sectional view of the improved lighting assembly according to a fourth embodiment of the invention.

FIG. 5 shows another embodiment of the present invention in which a light assembly 143 does not contain a power source, but rather includes a plug 160 for electrically connecting the link port 150 to the lighting assembly 143. In addition, the lighting assembly 143 is raised from game device 104 by a distance $D_2$ that is either predetermined or user settable. There is no magnifying lens in either frame opening 146a and 146b, and thus the distance $D_2$ provides a wider dispersion angle for the light generated by the lighting assembly in reaching the display screen 106. The game device 104 includes a volume control dial 152 and an external link port 150 that can be used to connect the game device to other game devices for head to head game playing. Link port 150 can also be used to provide power to the lighting assembly 143 by inserting plug 160 that is electrically connected to the lighting assembly. In this manner, lighting assembly 143 can be powered using the battery power contained within game device 104 and does not require its own battery supply or on/off switch. Thus, when the game device is powered on, the power supply to link port 150 is automatically provided, thereby automatically powering the lighting assembly 143. The use of an on/off switch in this embodiment may be an option provided by the manufacturer.

Figure 6:
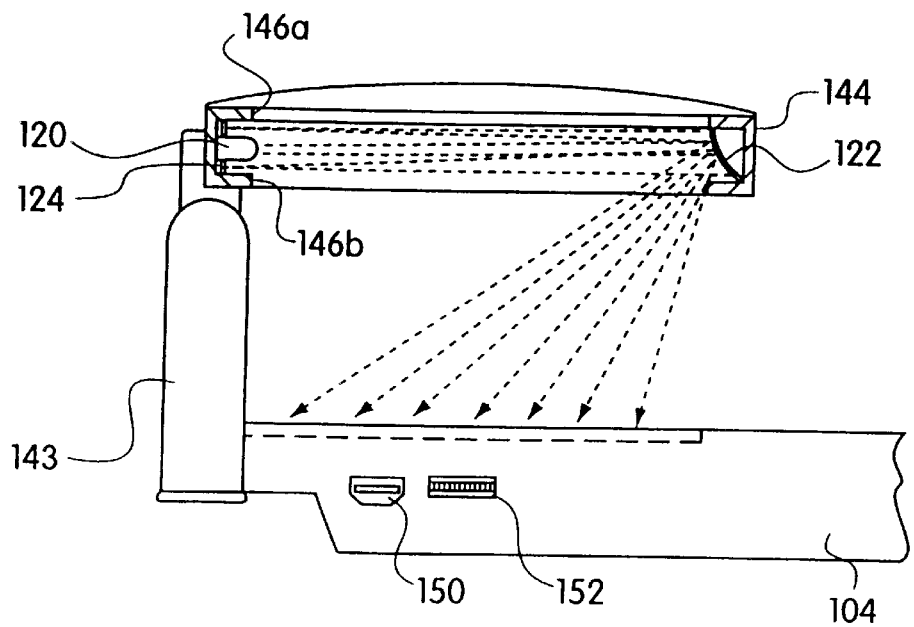
FIG. 6 is a side partial cross sectional view of the improved lighting assembly according to a fifth embodiment of the invention.

FIG. 6 shows another embodiment of lighting assembly 143 where the upper frame opening 164a and lower frame opening 164b are the same size. In this embodiment, it is not necessary for light source 120 and curved reflective surface 122 to be completely recessed into the frame 144. As such, light source 120 and curved reflective surface 122 may extend into the opening formed by upper and lower frame openings 164a and 164b, respectively.

Figure 7:
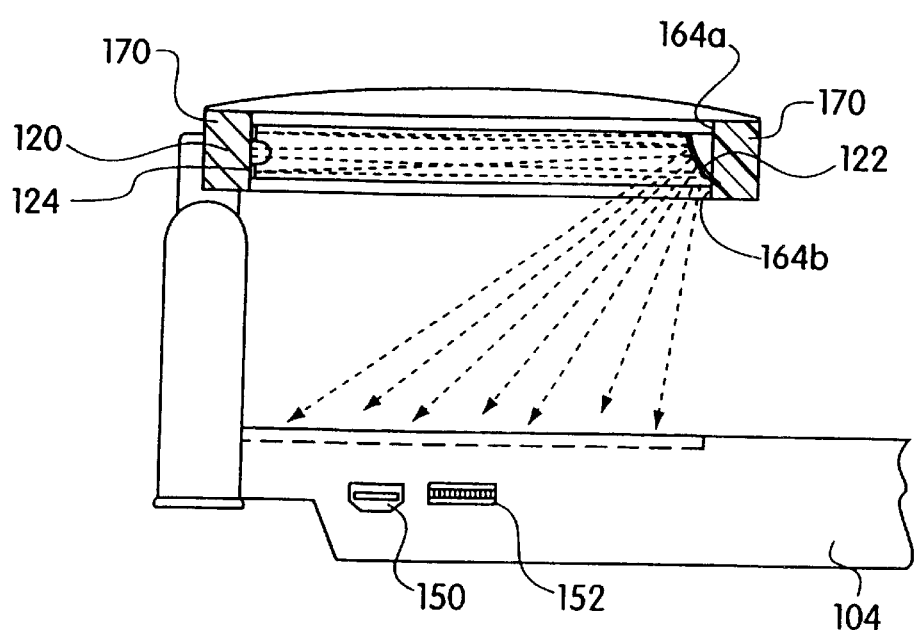
FIG. 7 is a side partial cross sectional view of the improved lighting assembly according a sixth embodiment of the invention.
Figure 8:
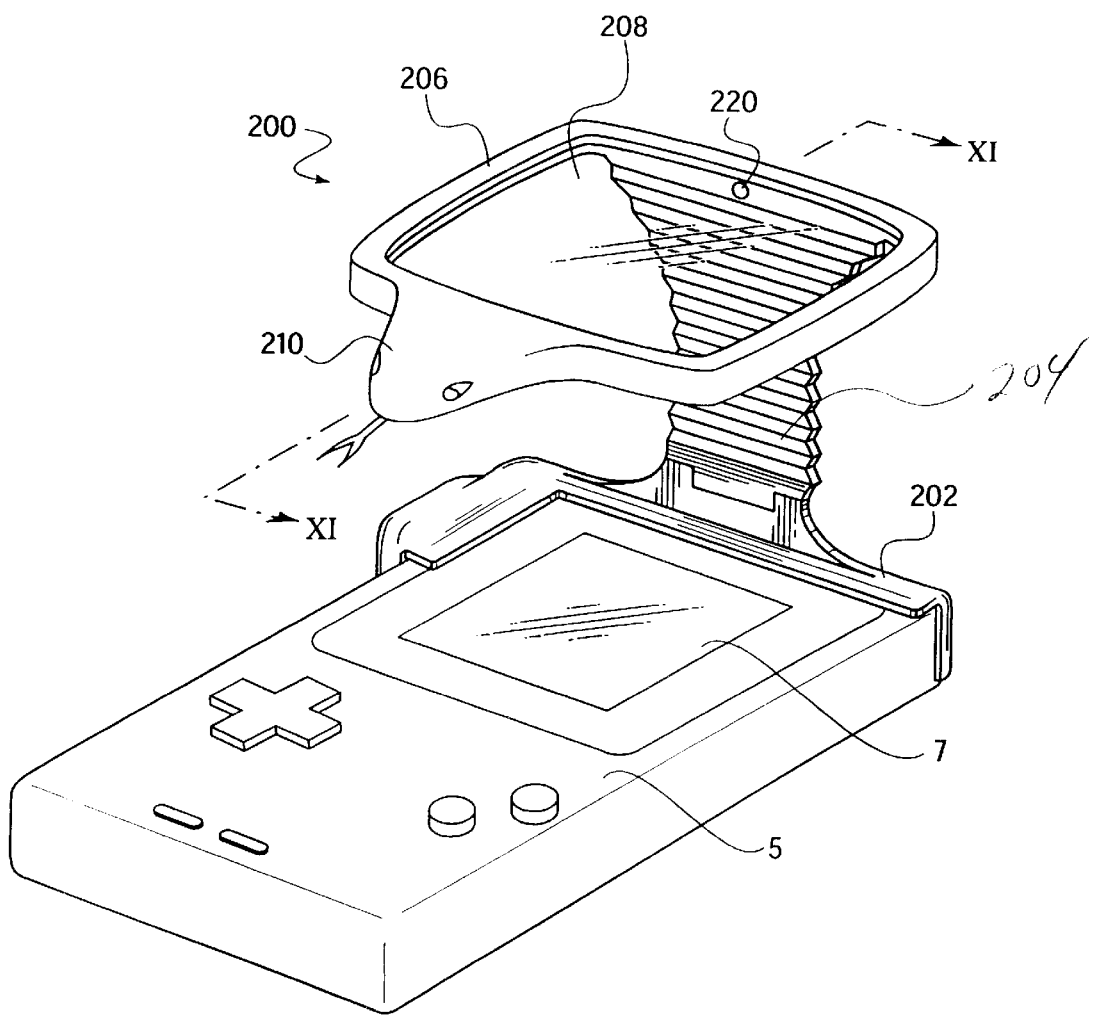
FIG. 8 is perspective view of a combined lighting assembly/magnifier according to a seventh embodiment of the invention.
Figure 9:
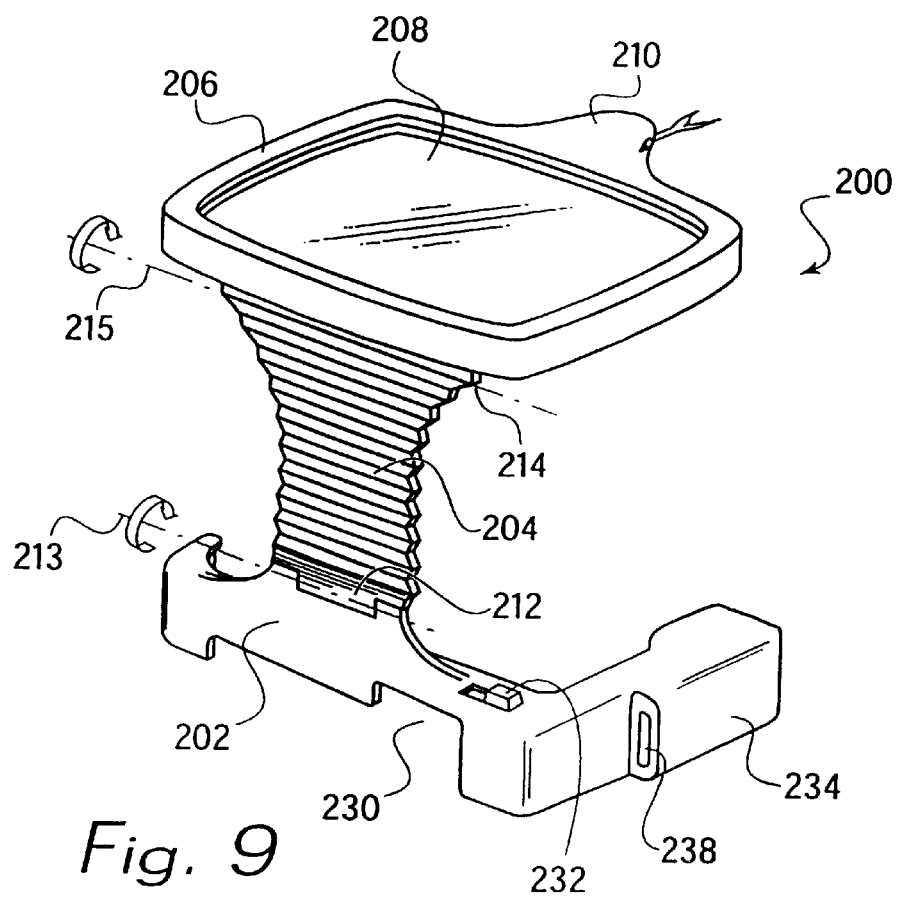
FIG. 9 is a rear perspective view of a combined lighting assembly/magnifier according to the seventh embodiment of the invention.

FIG. 7 shows yet another embodiment of lighting assembly 142 wherein flame 170 does not have a C-shaped cross-section. Thus, light source 120 and curved reflective surface 122 are disposed between upper frame opening 164a and lower flame opening 164b without necessarily being recessed into the respective side of the frame 144. Those of ordinary skill will recognize that light source 120 can be completely recessed into the frame such that it is not visible from the cross sectional view depicted by FIG. 7.

Referring to FIGS. 8–11, there is shown a combined light/magnifier 200 according to another embodiment of the invention. As shown, the combined light/magnifier 200 includes a base portion 202 for releasably connecting the light/magnifier to the game device 5. An upper frame like portion 206 is raised from the base portion 202 by an upward extension 204. Within frame 206 is a magnifying lens 208. According to one embodiment, the flame 206 with lens 208 can be pivotally connected to upward extension 204 by a hinge 214 and thereby rotate along axis 215. In addition, the upward extension 204 can be pivotally connected to base portion 202 by a hinge 212 and thereby rotate about axis 213. The power supply for light/magnifier 200 can be internal to the device (i.e., its own battery) or can be provided via the link port 150 as described in the previous embodiments.

Base portion 202 includes an optional on/off switch 232, a window 230 to accommodate various features of the game devices (e.g., IR window, on/off switch), and may also include an external jack 238 adapted to provide the user with access to the link port 150 of the game device (FIG. 7), while the combined light/magnifier 200 utilizes such port for power supply.

Figure 10:
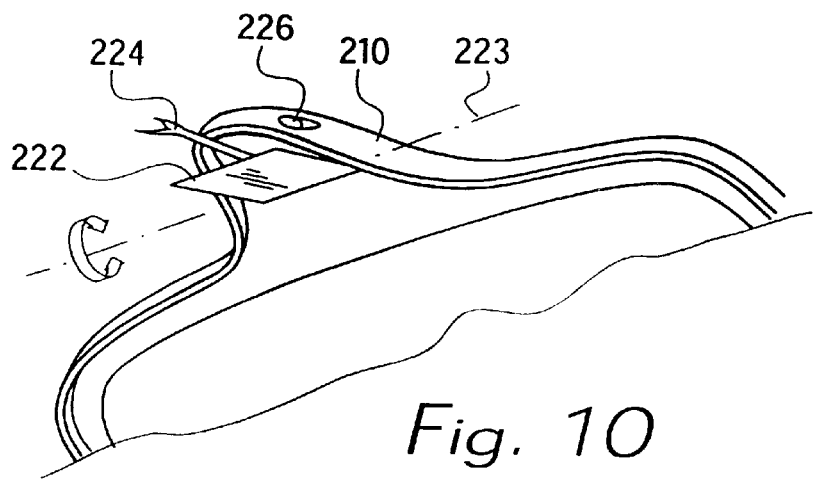
FIG. 10 is a partial view of the underside of the reflector housing of the combined lighting assembly/magnifier according to the seventh embodiment of the invention.
Figure 11:
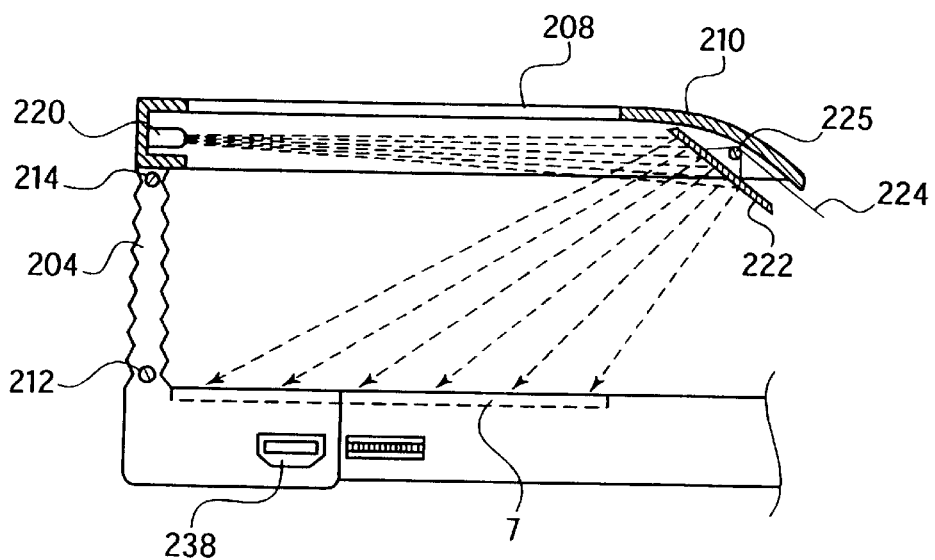
FIG. 11 is a partial cross-sectional view of the combined lighting assembly/magnifier taken along line XI—XI of FIG. 8.

A light source 220 is provided within flame 206 as described in the previous embodiments. A reflective surface 222 is disposed within reflector housing 210 and positioned opposite light source 220. The reflective surface 222 is preferably pivotally mounted 225 so as to be angulary adjustable with respect to the light source 220 and the display screen 7. Reflective surface 222 may also be fixed with respect to light source 220, with positioned adjustment being provided through the respective hinge connections between portions. The pivotal mounting 225 rotates about the axis 223 shown in FIG. 10. The pivotal movement of reflector 222 can be made by the user through manual movement of the reflector, or alternatively, the pivotal mounting 225 can be connected to an external lever or dial to provide for easier adjustment. As shown in FIGS. 10 and 11, the snake tongue 224 or even a fang could be connected to the pivotal mounting 225 such that movement of the reflector 222 is effected by movement of the corresponding tongue or fang. The snake eyes 226 are also shown and may be adapted to light up in a particular color based on the colors used to create eyes. This lighting of the eyes could be provided with a light pipe, fiber optic line or other known means for providing light to the eye area.

Referring to FIG. 11, when light source 220 is illuminated, it directs light across the frame and directly at reflective surface 222. The reflective surface 222 reflects the light toward the display screen 7 and thereby effectively illuminates the screen in an even and diffused manner. As mentioned previously, the light source 222 is preferably directional in nature, thereby enabling the substantial directing of the light toward the reflective surface 222. Reflective surface 222 can be any suitable known reflector such as, for example, a mirror, reflective mylar, hot stamped chrome, etc.

Figure 12:
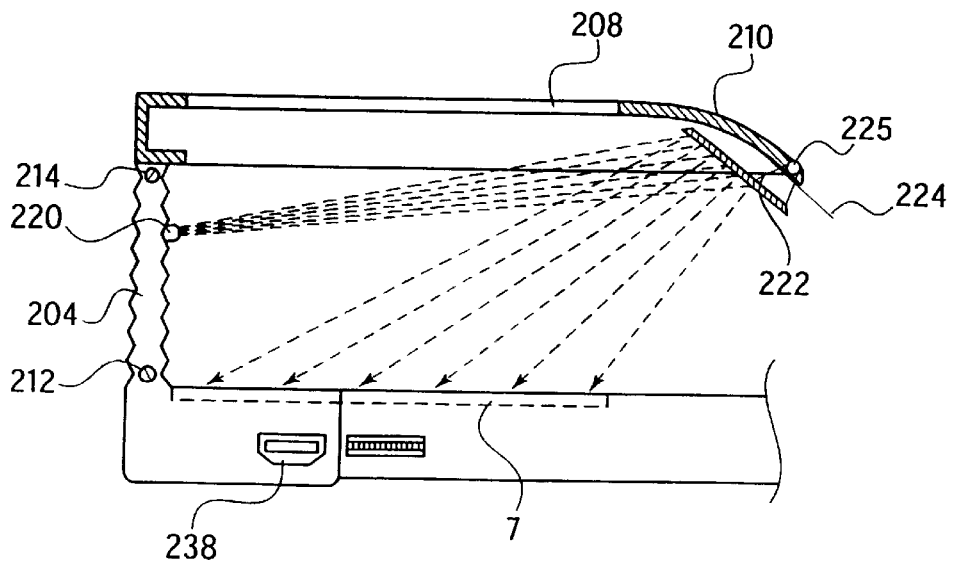
FIG. 12 is a partial cross-sectional view of the combined lighting assembly/magnifier according to another embodiment of the invention.
Figure 13:
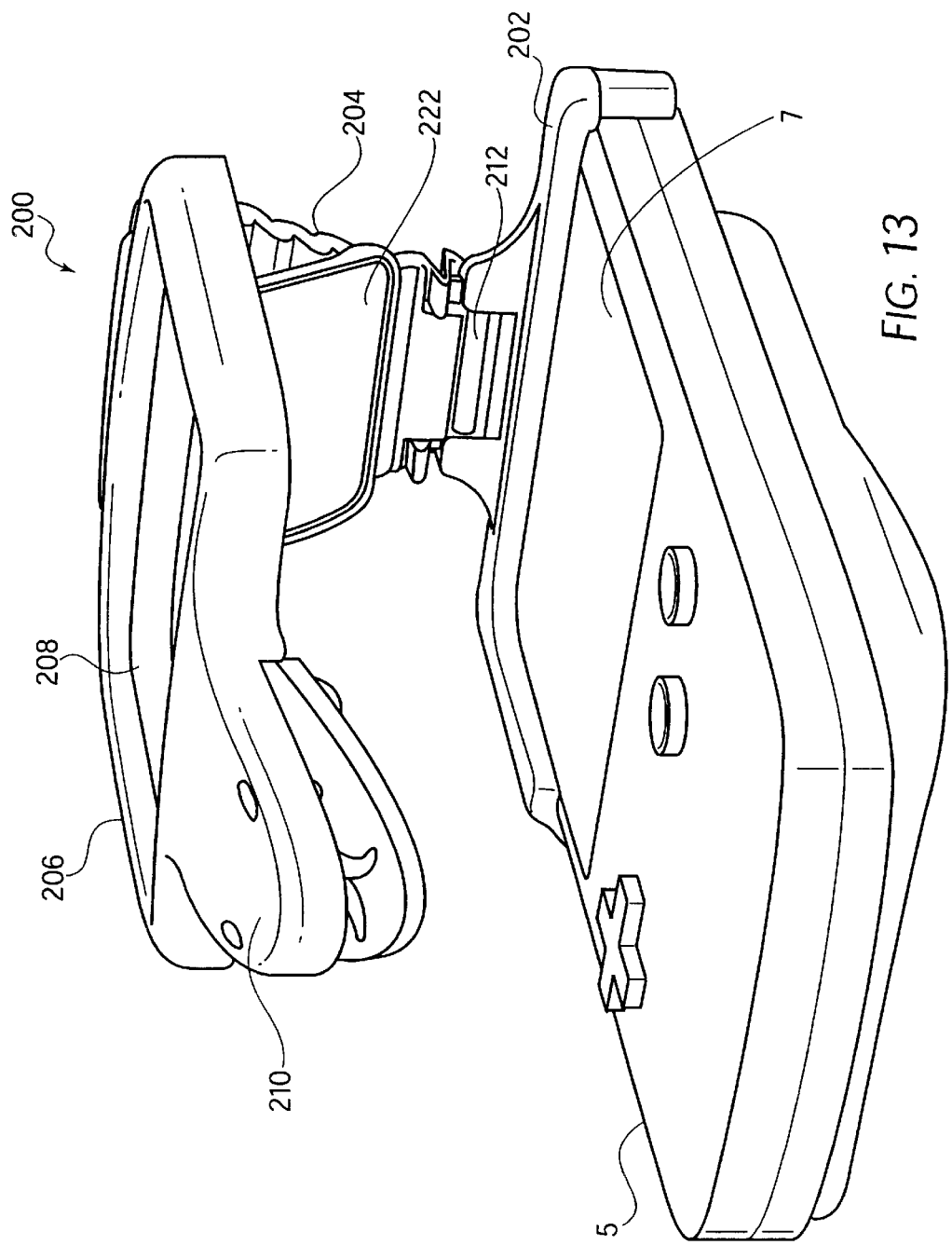
FIG. 13 is a perspective view of the combined light/magnifier according to another embodiment of the invention.

FIG. 12 shows another embodiment of combined light/magnifier 200 according to the invention. As shown, light source 220 has be relocated to the upward extension 204 and directed at reflective surface 220 so as to redirect the reflected light onto display screen 7. The pivotal mounting 225 of reflective surface 222 is positioned on the end of the housing 210 such that the cobra tongue 224 or other device is used to adjust the angle at which reflective surface 222 is positioned with respect to light source 220 and display screen 7. Other contemplated devices for enabling the pivot motion of the reflective surface 222, other than the tongue 224, can be, for example, an animal or insect in the mouth of the cobra designed snake. Those of ordinary skill will recognize that the location of light source 220 and pivotal mounting 225 of reflective surface 222 can be modified without departing from the spirit of the invention.

FIGS. 13–18 show another embodiment of the invention where the location of light source 220 and the reflective surface 222 (along with pivotal mounting 225) have been reversed. As described in reference to the previous embodiments, the combined light/magnifier 200 includes a base 12 that is releasably connectable to the game device 5, an upward extending neck portion 204 and a top viewing frame 206. Neck 204 is connected to base 12 via a hinge or other pivotal connection 212 and includes a locking mechanism 300 (FIGS. 14 and 16) for securing neck 204 in a substantially perpendicular position with respect to base 12. Viewing frame 206 includes a magnifying lens 208 for magnifying the image displayed on screen 7 during use of the same. The magnifying power of lens 208 may be adjusted according to preferred viewing of the magnified display. For example, lens 208 can be a 9 mm or 11 mm lens, however those of skill in the art will recognize that the type and magnifying power of lens 208 is a matter of design choice and may be changed without departing from the spirit of the present invention.

Viewing frame 206 includes a front portion 210 that is made up of an upper part 205 and a lower part 207. Although front portion 210 is shown shaped like a snake head, it will become clear that the shape of portion 210 is not integral to the operation and utility of the present invention. The lower font portion 207 functions to help house part of the light housing 221 which contains the light source 220 in addition to providing increased aesthetics for the snake design. Light housing 221 includes a light source 220 (shown in dotted lines) that is not directed at screen 7, but rather at the oppositely positioned reflecting surface 222. The reflecting surface 222 includes a hinged portion 225 that enables reflecting surface 222 to be angularly and adjustably positioned on the inside of neck portion 204 so as to receive light from light source 220 and reflect the same toward display screen 7 on game device 5 (see FIG. 14). Hinged portion 225 is designed so as to enable reflecting surface 222 to be pivoted without interfering with the viewing frame 206 and/or upward extending neck 204 and enable the collapsing of the entire light/magnifier 200 for storage.

Figure 14:
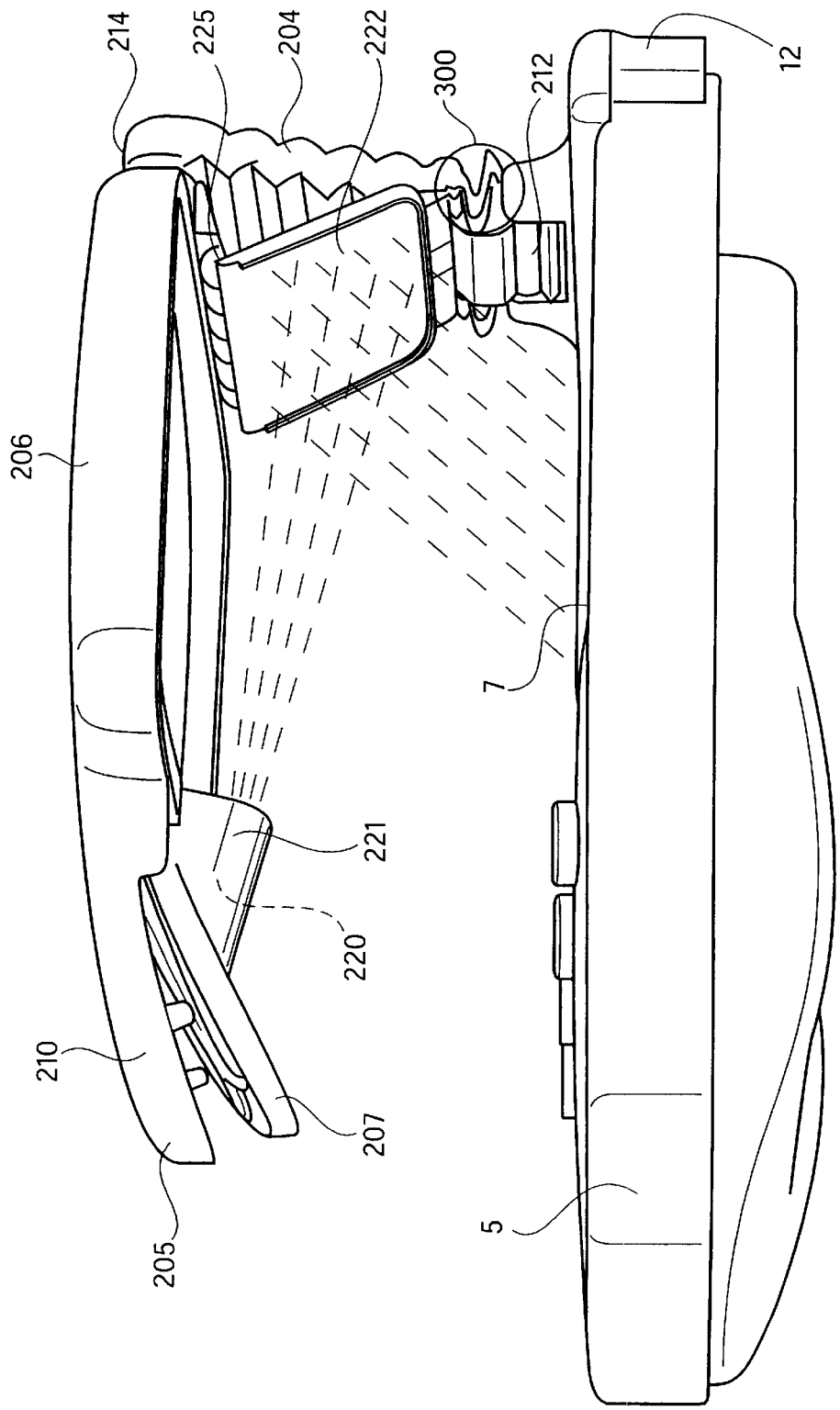
FIG. 14 is a side view of the combined light/magnifier according to another embodiment of the invention.
Figure 15:
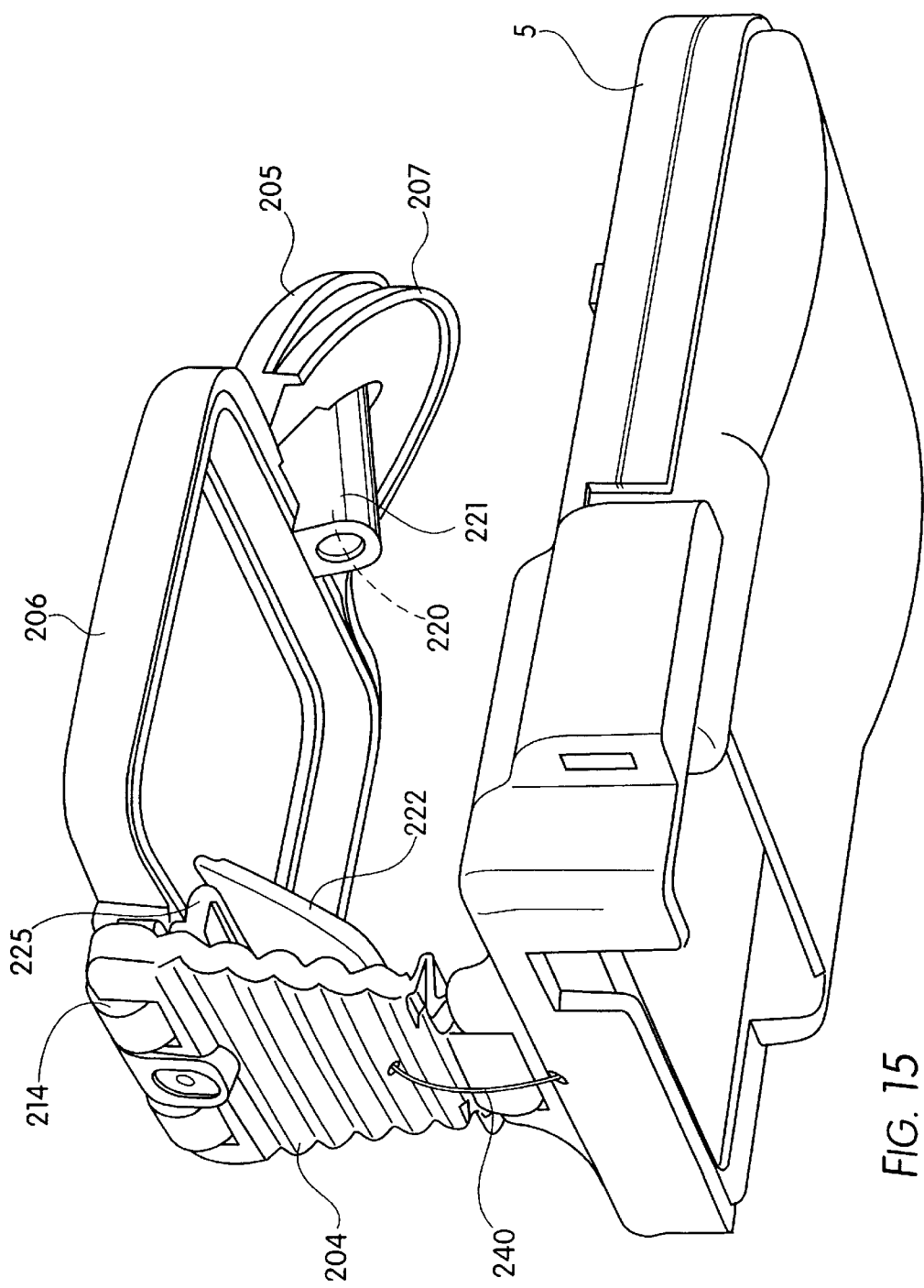
FIG. 15 is a rear side perspective view of the combined light/magnifier according to another embodiment of the invention.
Figure 16:
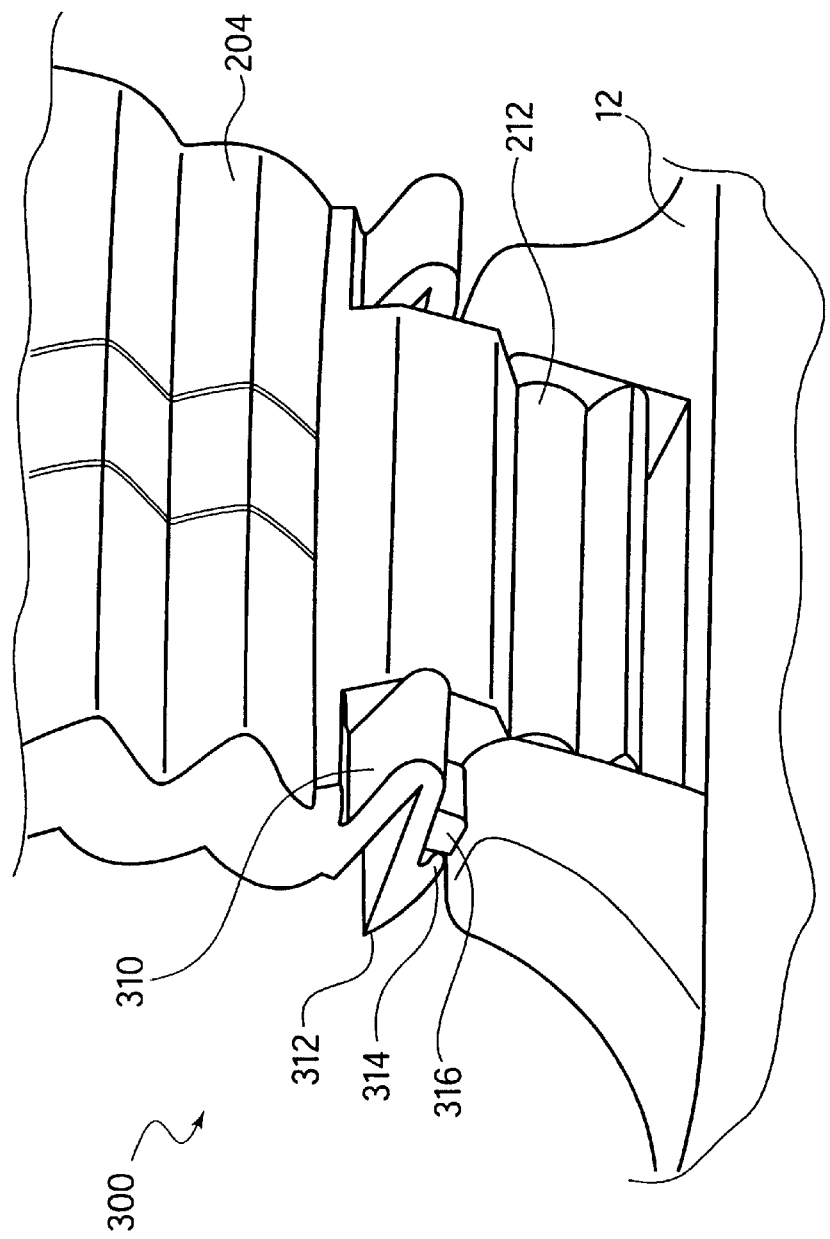
FIG. 16 is an enlarged view of the detailed portion A of FIG. 14 depicting the locking mechanism implemented by the combined light/magnifier according to an embodiment of the invention.
Figure 17:
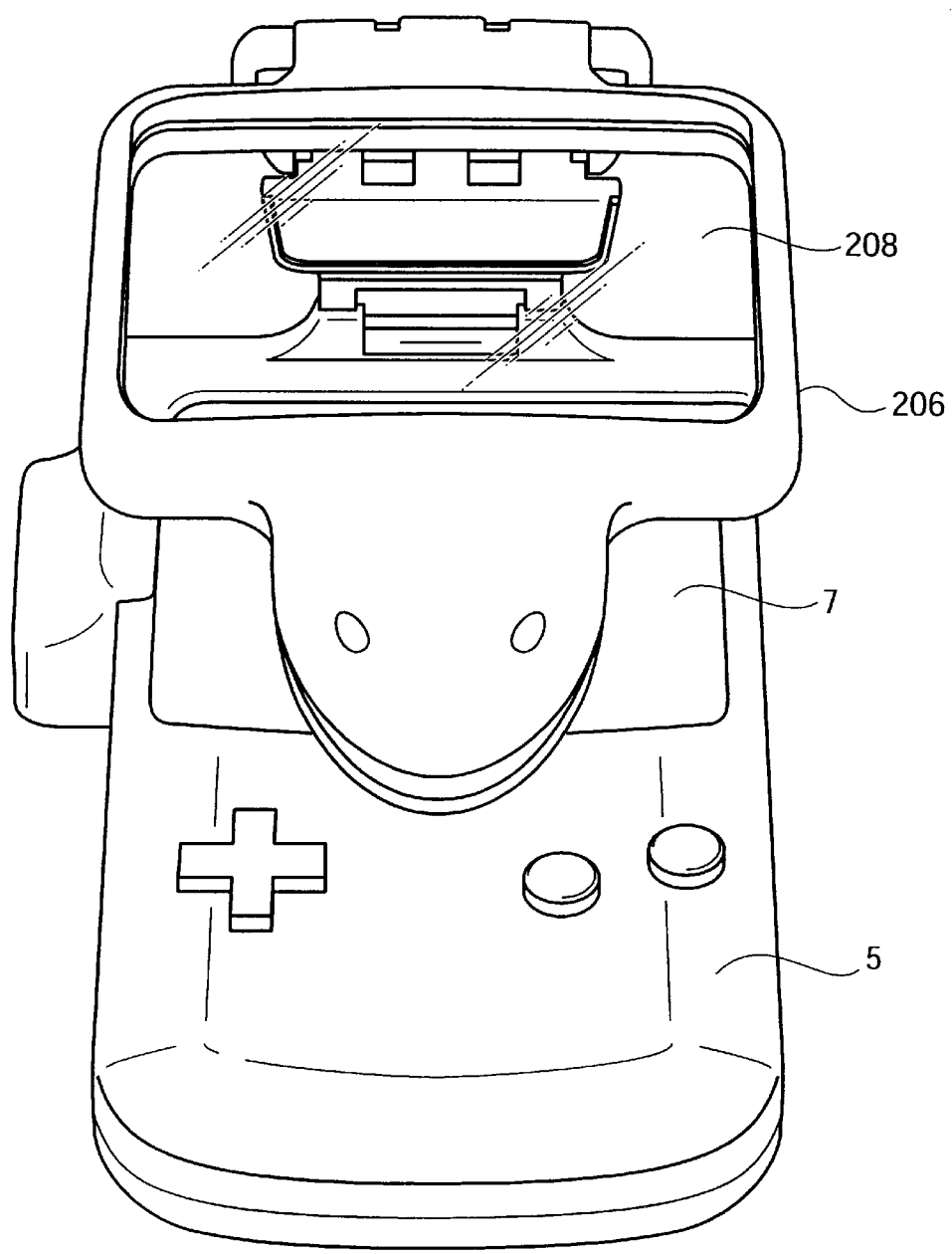
FIG. 17 is a top view of the combined light/magnifier assembly according to another embodiment of the invention.
Figure 18:
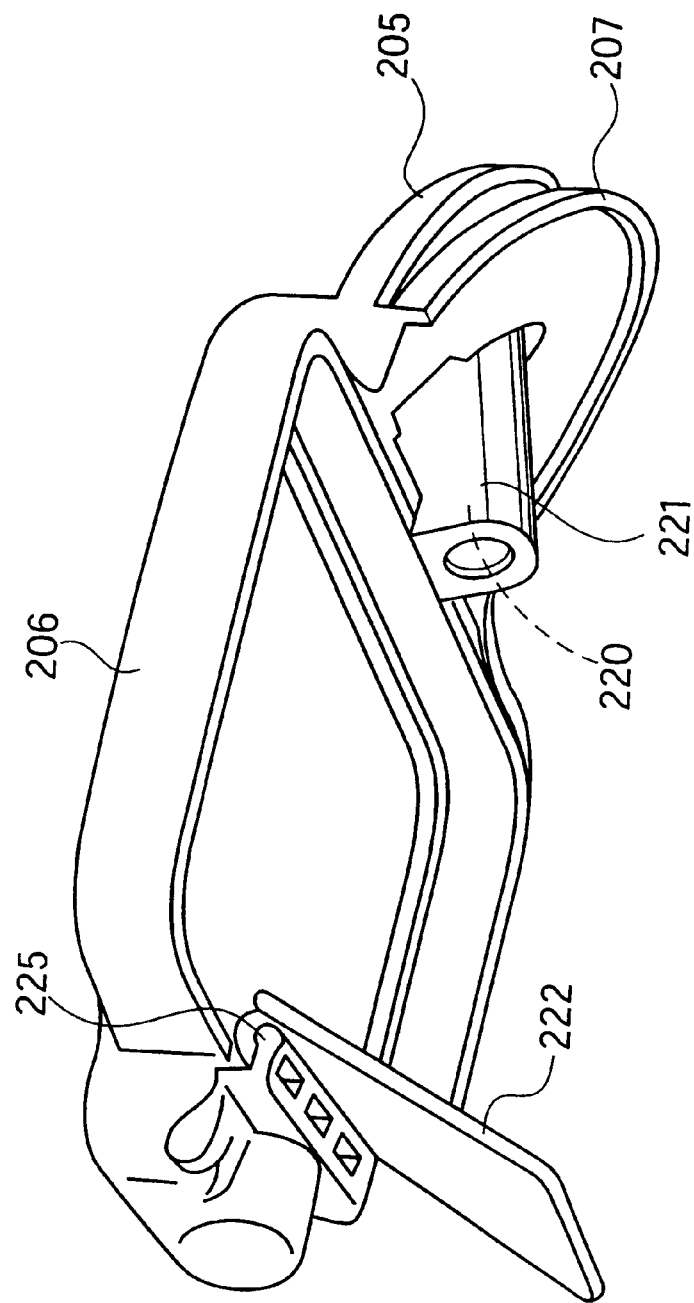
FIG. 18 is a bottom perspective view of the combined light/magnifier according to an embodiment of the invention.

Referring to FIGS. 14 and 16, there is shown a locking mechanism 300 for securing neck 204 in a substantially perpendicular position with respect to base 12. Locking mechanism 300 includes a resilient member 310 connected with the bottom edge of neck 204. Resilient member 310 is preferably integrally formed with the bottom edge of 204, but may be connected in any suitable known manner. The lower end of resilient member 310 includes an engaging end 312 and a locking pawl 314. A locking flange 316 is connected to and extends upward from base portion 12 . In order to lock neck 204 into its operable, substantially perpendicular position, neck 204 is pivoted backward such that end 312 engages the top of locking flanges 316. As neck 204 is further pivoted backward, end 312 slides up over locking flange 316 such that locking pawl 314 snaps over locking flange 316. In order to release neck 204 from its locked position, end 312 is lied by the user until locking pawl 314 clears locking flange 316 such that neck 204 can be pivoted forward and out of its locked position.

As shown, combined light/magnifier 200 is generally in the shape of a cobra snake. This depiction of a cobra snake is an exemplary embodiment and is not intended to limit the scope of this invention. Those of ordinary skill will also recognize that the light technology disclosed herein can be implemented into devices of varying shapes and sizes without departing from the spirit of the present invention.

While there have been shown and described and pointed out fundamental novel features of the invention as applied to preferred embodiments thereof, it will be understood that various omissions, substitutions, changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. A combined light/magnifier assembly for use in enhancing the view of a compact computer video screen, the combined light/magnifier comprising:

a frame having a frame opening being positionable over the video screen;

a magnifying lens disposed within said frame opening;

a light source for projecting light in a predetermined direction; and a reflective surface positioned in a path of said predetermined direction to receive and reflect light from said light source toward the video screen, wherein said reflective surface comprises a curved reflective surface, and wherein the combined light/magnifier assembly further comprises an additional reflective surface disposed opposite said curved reflective surface for further reflecting light reflected from said curved reflective surface back toward said curved reflective surface.

2. A combined light/magnifier assembly for use in enhancing the view of a compact computer video screen, the combined light/magnifier comprising:

a frame having a frame opening being positionable over the video screen;

a magnifying lens disposed within said frame opening;

a light source for projecting light in a predetermined direction; and a reflective surface positioned in a path of said predetermined direction to receive and reflect light from said light source toward the video screen, wherein said reflective surface comprises a mirror.

3. The combined light/magnifier assembly according to claim 2, wherein said light source comprises an incandescent light.

4. The combined light/magnifier assembly according to claim 2, further comprising power supply means for selectively supplying said light source with electrical current.

5. The combined light/magnifier assembly according to claim 2, wherein said light source comprises a directional light source.

6. The combined light/magnifier assembly according to claim 2 wherein said light source comprises a light emitting diode (LED).

7. The combined light/magnifier assembly according to claim 2, wherein said reflective surface comprises a flat reflective surface.

8. A combined light/magnifier assembly for use in enhancing the view of a compact computer video screen, the combined light/magnifier comprising:

a frame having a frame opening being positionable over the video screen;

a magnifying lens disposed within said frame opening;

a light source for projecting light in a predetermined direction; and a reflective surface positioned in a path of said predetermined direction to receive and reflect light from said light source toward the video screen, wherein said reflective surface comprises reflective mylar.

9. The combined light/magnifier assembly according to claim 8, further comprising power supply means for supplying the light source with electrical current.

10. The combined light/magnifier assembly according to claim 8, wherein said light source comprises an incandescent light.

11. The combined light/magnifier assembly according to claim 8, wherein said light source comprises a directional light source.

12. The combined light/magnifier assembly according to claim 8, wherein said light source comprises a light emitting diode (LED).

13. A combined light/magnifier assembly for use in enhancing the view of a compact computer video screen, the combined light/magnifier comprising:

a frame having a frame opening being positionable over the video screen;

a magnifying lens disposed within said frame opening;

a light source for projecting light in a predetermined direction; and a reflective surface positioned in a path of said predetermined direction to receive and reflect light from said light source toward the video screen, wherein said reflective surface comprises hot stamped chrome.

14. A combined light/magnifier assembly for use in enhancing the view of a compact computer video screen, the combined light/magnifier comprising:

a frame having a frame opening being positionable over the video screen;

a magnifying lens disposed within said frame opening;

a light source for projecting light in a predetermined direction; and a reflective surface positioned in a path of said predetermined direction to receive and reflect light from said light source toward the video screen, wherein said reflective surface comprises a curved reflective surface.

15. A combined light/magnifier assembly for use in enhancing the view of a compact computer video screen, the combined light/magnifier comprising:

a frame having a frame opening being positionable over the video screen;

a magnifying lens disposed within said frame opening;

a light source for projecting light in a predetermined direction;

a reflective surface positioned in a path of said predetermined direction to receive and reflect light from said light source toward the video screen; and power supply means for supplying the light source with electrical current;

wherein said power supply means comprises a plug electric adapted to be releasably connected to a link port of the compact computer device.

16. The combined light/magnifier assembly according to claim 9, wherein said power supply means comprises:

a battery compartment;

a battery power source; and electrical circuitry connecting said battery power to said light source.

17. The combined light/magnifier assembly according to claim 16, wherein said electrical circuitry further comprises an on/off power switch for selectively providing power to said light source.

18. A combined light/magnifier assembly for use in enhancing the view of a compact computer video screen, the combined light/magnifier comprising:

a frame having a frame opening being positionable over the video screen;

a magnifying lens disposed within said frame opening;

a light source for projecting light in a predetermined direction; and reflective surface positioned in a path of said predetermined direction to receive and reflect light from said light source toward the video screen, wherein said reflective surface comprises a flat reflective surface, and wherein said flat reflective surface is pivotally mounted to said frame.

19. A combined light/magnifier assembly for use in enhancing the view of a compact computer video screen, the combined light/magnifier comprising:

a frame having a frame opening being positionable over the video screen;

a magnifying lens disposed within said frame opening;

a light source for protecting light in a predetermined direction; and a reflective surface positioned in a path of said predetermined direction to receive and reflect light from said light source toward the video screen, wherein said reflective surface comprises a curved reflective surface, and wherein said curved reflective surface is pivotally mounted to said frame.

20. A combined light/magnifier assembly for use in enhancing the view of a compact computer video screen, the combined light/magnifier comprising:

a frame having a frame opening being positionable over the video screen;

a magnifying lens disposed within said frame opening;

a light source for projecting light in a predetermined direction; and a reflective surface positioned in a path of said predetermined direction to receive and reflect light from said light source toward the video screen, wherein said holding means further comprises a frame having a frame opening formed from an upper frame opening and a lower frame opening, said magnifying lens being disposed in said frame opening, said frame opening being positionable over the video screen, and wherein said light source is disposed within said frame opening between said upper and lower frame openings, and said reflective surface is disposed between said upper and lower frame openings.

* * * * *